United States Patent
Cheng et al.

(10) Patent No.: US 10,986,679 B2
(45) Date of Patent: *Apr. 20, 2021

(54) PROXIMITY SERVICE SIGNALING PROTOCOL

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Michaela Vanderveen, Tracy, CA (US); Saurabha Rangrao Tavildar, Mountain View, CA (US); Haris Zisimopoulos, London (GB); Shailesh Patil, San Diego, CA (US); Bilal Sadiq, Basking Ridge, NJ (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,891

(22) Filed: Feb. 12, 2019

(65) Prior Publication Data

US 2019/0174566 A1  Jun. 6, 2019

Related U.S. Application Data

(63) Continuation of application No. 15/048,463, filed on Feb. 19, 2016, now Pat. No. 10,237,904.
(Continued)

(51) Int. Cl.
*H04W 76/14* (2018.01)
*H04W 4/90* (2018.01)
(Continued)

(52) U.S. Cl.
CPC ............. *H04W 76/14* (2018.02); *H04W 4/08* (2013.01); *H04W 4/80* (2018.02); *H04W 4/90* (2018.02);
(Continued)

(58) Field of Classification Search
None
See application file for complete search history.

(56) References Cited

U.S. PATENT DOCUMENTS

2013/0324114 A1   12/2013   Raghothaman et al.
2014/0198708 A1   7/2014   Lee
(Continued)

FOREIGN PATENT DOCUMENTS

EP       2833694 A2       2/2015
WO    WO2010031427 A1   3/2010
(Continued)

OTHER PUBLICATIONS

International Search Report and Written Opinion—PCT/US2016/018851—ISA/EPO—dated Oct. 4, 2016.
(Continued)

*Primary Examiner* — Saad Khawar
(74) *Attorney, Agent, or Firm* — Holland & Hart LLP

(57) ABSTRACT

Methods, systems, and devices are described for signaling protocols for proximity service functions in a wireless communication system. A first wireless device may identify a wireless relay requirement associated with the first wireless device. A proximity service protocol may be initiated between the first wireless device and a second wireless device based at least in part on the identified wireless relay requirement. The proximity service protocol may be initiated prior to an initiation of a communication data exchange between the first wireless device and the second wireless device. A relay link may be established, via the ProSe
(Continued)

protocol, between the first wireless device and the second wireless device based at least in part on the identified wireless relay requirement.

30 Claims, 11 Drawing Sheets

Related U.S. Application Data

(60) Provisional application No. 62/139,190, filed on Mar. 27, 2015.

(51) Int. Cl.
    *H04W 4/80*     (2018.01)
    *H04W 4/08*     (2009.01)
    *H04W 8/00*     (2009.01)
    *H04W 88/04*     (2009.01)
    *H04W 76/34*     (2018.01)

(52) U.S. Cl.
    CPC ............ *H04W 8/005* (2013.01); *H04W 76/34* (2018.02); *H04W 88/04* (2013.01)

(56) References Cited

U.S. PATENT DOCUMENTS

| | | |
|---|---|---|
| 2015/0009908 A1 | 1/2015 | Kalapatapu et al. |
| 2015/0029866 A1* | 1/2015 | Liao ..................... H04W 4/023 370/241 |
| 2015/0045044 A1 | 2/2015 | Liu et al. |
| 2016/0088668 A1* | 3/2016 | Kim ..................... H04W 48/16 370/315 |
| 2016/0156404 A1 | 6/2016 | Wolfner et al. |
| 2016/0204847 A1 | 7/2016 | Ryu et al. |
| 2016/0269185 A1* | 9/2016 | Stojanovski .......... H04L 9/3247 |
| 2016/0270134 A1 | 9/2016 | Stojanovski |
| 2016/0286590 A1 | 9/2016 | Cheng et al. |
| 2016/0374104 A1* | 12/2016 | Watfa ................ H04W 36/0011 |

FOREIGN PATENT DOCUMENTS

| | | |
|---|---|---|
| WO | WO-2014117854 A1 | 8/2014 |
| WO | WO-2015005900 A1 | 1/2015 |
| WO | WO2015015242 A1 | 2/2015 |
| WO | WO-2015020381 A1 | 2/2015 |
| WO | WO2015026111 A1 | 2/2015 |
| WO | WO-2015035915 A1 | 3/2015 |

OTHER PUBLICATIONS

ISA/EPO, Partial International Search Report of the International Searching Authority, Int'l. App. No. PCT/US2016/018851, dated Jun. 7, 2016, European Patent Office, Rijswijk, NL, 6 pgs.

Taiwan Search Report—TW105105153—TIPO—dated Jun. 30, 2019 (152660TW).

* cited by examiner

PROXIMITY SERVICE SIGNALING PROTOCOL

CROSS REFERENCES

The present application for patent is a continuation of U.S. patent application Ser. No. 15/048,463 by Cheng, et al., entitled "Proximity Service Signaling Protocol" filed Feb. 19, 2016, which claims priority to U.S. Provisional Patent Application No. 62/139,190 by Cheng et al., entitled "PROXIMITY SERVICE SIGNALING PROTOCOL," filed Mar. 27, 2015, assigned to the assignee hereof, and expressly incorporated by reference herein.

BACKGROUND

Field of the Disclosure

The present disclosure, for example, relates to wireless communication systems, and more particularly to proximity service protocols.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may communicate directly with neighboring UEs using proximity services (ProSe) communications.

A UE (an edge UE) may move out of coverage area of a base station and, instead, use a relay UE to continue communicating with the network. For example, the edge UE may discover the existence of the relay UE using a ProSe Direct Discovery service, and select the relay UE for use. The edge UE may establish a connection with the relay UE in order for the traffic from the edge UE to be forwarded to the network, and so that the traffic from the network can be relayed to the edge UE. As a result, the edge UE may exchange some information with the relay UE to establish the relay link. Current configurations, however, do not provide support for protocols to exchange information to establish the ProSe relay link between an edge UE and a relay UE.

SUMMARY

The described features for example relate to one or more improved systems, methods, and/or devices for ProSe signaling protocols in a wireless communication system. Some aspects of the present description employ a ProSe protocol or stack established on UEs configured to support ProSe operations. The ProSe protocol may manage one or more aspects of establishment of a ProSe relay link between the UEs. For example, a first UE (or wireless device) may determine or identify that it has left the coverage area of a base station, or otherwise lost connection, and therefore has a relay requirement. The first UE may initiate the ProSe protocol based at least in part on the requirement for a ProSe wireless relay. The ProSe protocol may be initiated prior to initiation of a communication data exchange between the first UE and a second UE. For example, the ProSe protocol may be a layer 3 (L3) protocol whereas the communication data exchange may be associated with a layer 2 (L2) or a layer 1 (L1) protocol. The first UE may use the ProSe protocol to establish a relay link between the first UE and a second UE. The relay link may be a wireless ProSe relay link that uses a PC5 communication reference point.

In a first illustrative set of examples, a method for wireless communication is provided. The method may include: identifying a wireless relay requirement associated with a first wireless device; initiating a proximity service (ProSe) protocol between the first wireless device and a second wireless device based at least in part on the identified wireless relay requirement, the ProSe protocol initiated prior to an initiation of a communication data exchange between the first wireless device and the second wireless device; and establishing, via the ProSe protocol, a relay link between the first wireless device and the second wireless device based at least in part on the identified wireless relay requirement.

In some aspects, the method may include managing one or more message exchanges between the first wireless device and the second wireless device, the one or more message exchanges associated with a ProSe association process of the ProSe protocol. The ProSe protocol may be carried over a packet data convergence protocol (PDCP). The method may include identifying the ProSe protocol based at least in part on a packet data convergence protocol (PDCP) protocol data unit (PDU) type associated with the ProSe protocol. The ProSe association process may include sending a ProSe association request message. The ProSe association request message may include at least a message type parameter, or a command parameter, or a wireless device identity parameter, or a service layer information parameter, or a security information parameter, or an internet protocol (IP) configuration parameter, or a historical parameter, or a transaction identifier parameters, or a link identifier parameter, or a reason parameter, or a follow-up parameter, or a combination thereof.

In some aspects, the method may include receiving a ProSe association response message. The ProSe association response message may include at least a message type parameter, or a result parameter, or a command parameter, or a wireless device identity parameter, or a service layer information parameter, or a security information parameter, or an internet protocol (IP) configuration parameter, or a transaction identifier parameter, or a follow-up operation parameter, or a combination thereof. The ProSe association request message may be sent from the first wireless device and the ProSe association response message is received from the second wireless device. The ProSe association request message may be sent from the second wireless device and the ProSe association response message is received from the first wireless device. The method may include exchanging one or more ProSe association follow-up messages to establish the relay link between the first wireless device and the second wireless device.

In some aspects, the method may include determining that the first wireless device has entered a coverage area of at least one base station; and sending one or more messages to the second wireless device to terminate the relay link. The one or more messages may include at least a message type parameter, or a command parameter, or a wireless device identity parameter, or a reason parameter, or a transaction identifier parameter, or a combination thereof. The method may include receiving a message from the second wireless device conveying an indication that the second wireless device has left a coverage area of at least one base station; and terminating the relay link based at least in part on the received message. The message may include at least a message type parameter, or a command parameter, or a wireless device identity parameter, or a reason parameter, or a transaction identifier parameter, or a combination thereof.

In some aspects, the method may include exchanging one or more messages with the second wireless device; and determining a relay state associated with the relay link based at least in part on the exchanged one or more messages. The relay state may include at least an indication of one or more of a duration interval, or a link identifier parameter, or an identifier information parameter, or a wireless medium information associated with the relay link, or a combination thereof.

In a second illustrative set of examples, an apparatus for wireless communication is provided. The apparatus may include a processor; memory in electronic communication with the processor; and instructions stored in the memory. The instructions being executable by the processor to: identify a wireless relay requirement associated with a first wireless device; initiate a proximity service (ProSe) protocol between the first wireless device and a second wireless device based at least in part on the identified wireless relay requirement, the ProSe protocol initiated prior to an initiation of a communication data exchange between the first wireless device and the second wireless device; and establish, via the ProSe protocol, a relay link between the first wireless device and the second wireless device based at least in part on the identified wireless relay requirement.

In some aspects, the apparatus may include instructions executable by the processor to manage one or more message exchanges between the first wireless device and the second wireless device, the one or more message exchanges associated with a ProSe association process of the ProSe protocol. The ProSe protocol may be carried over a packet data convergence protocol (PDCP). The apparatus may include instructions executable by the processor to identify the ProSe protocol based at least in part on a packet data convergence protocol (PDCP) protocol data unit (PDU) type associated with the ProSe protocol. The ProSe association process may include instructions executable by the processor to send a ProSe association request message. The ProSe association request message may include at least a message type parameter, or a command parameter, or a wireless device identity parameter, or a service layer information parameter, or a security information parameter, or an internet protocol (IP) configuration parameter, or a historical parameter, or a transaction identifier parameters, or a link identifier parameter, or a reason parameter, or a follow-up parameter, or a combination thereof.

In some aspects, the apparatus may include instructions executable by the processor to receive a ProSe association response message. The ProSe association response message may include at least a message type parameter, or a result parameter, or a command parameter, or a wireless device identity parameter, or a service layer information parameter, or a security information parameter, or an internet protocol (IP) configuration parameter, or a transaction identifier parameter, or a follow-up operation parameter, or a combination thereof. The ProSe association request message may be sent from the first wireless device and the ProSe association response message may be received from the second wireless device. The ProSe association request message may be sent from the second wireless device and the ProSe association response message may be received from the first wireless device.

In some aspects, the apparatus may include instructions executable by the processor to exchange one or more ProSe association follow-up messages to establish the relay link between the first wireless device and the second wireless device. The apparatus may include instructions executable by the processor to determine that the first wireless device has entered a coverage area of at least one base station; and send one or more messages to the second wireless device to terminate the relay link. The one or more messages may include at least a message type parameter, or a command parameter, or a wireless device identity parameter, or a reason parameter, or a transaction identifier parameter, or a combination thereof.

In some aspects, the apparatus may include instructions executable by the processor to receive a message from the second wireless device conveying an indication that the second wireless device has left a coverage area of at least one base station; and terminate the relay link based at least in part on the received message. The message may include at least a message type parameter, or a command parameter, or a wireless device identity parameter, or a reason parameter, or a transaction identifier parameter, or a combination thereof. The apparatus may include instructions executable by the processor to exchange one or more messages with the second wireless device; and determine a relay state associated with the relay link based at least in part on the exchanged one or more messages. The relay state may include at least an indication of one or more of a duration interval, or a link identifier parameter, or an identifier information parameter, or a wireless medium information associated with the relay link, or a combination thereof.

In a third illustrative set of examples, an apparatus for wireless communication is provided. The apparatus may include: means for identifying a wireless relay requirement associated with a first wireless device; means for initiating a proximity service (ProSe) protocol between the first wireless device and a second wireless device based at least in part on the identified wireless relay requirement, the ProSe protocol initiated prior to an initiation of a communication data exchange between the first wireless device and the second wireless device; and means for establishing, via the ProSe protocol, a relay link between the first wireless device and the second wireless device based at least in part on the identified wireless relay requirement.

In some aspects, the apparatus may include means for managing one or more message exchanges between the first wireless device and the second wireless device, the one or more message exchanges associated with a ProSe association process of the ProSe protocol. The ProSe protocol may be carried over a packet data convergence protocol (PDCP). The apparatus may include means for identifying the ProSe protocol based at least in part on a packet data convergence protocol (PDCP) protocol data unit (PDU) type associated with the ProSe protocol.

In a fourth illustrative set of examples, a non-transitory computer-readable medium storing computer-executable code for wireless communication is provided. The code executable by a processor to: identify a wireless relay requirement associated with a first wireless device; initiate a proximity service (ProSe) protocol between the first wireless device and a second wireless device based at least in part on the identified wireless relay requirement, the ProSe protocol initiated prior to an initiation of a communication data exchange between the first wireless device and the second wireless device; and establish, via the ProSe protocol, a relay link between the first wireless device and the second wireless device based at least in part on the identified wireless relay requirement.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Additionally, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
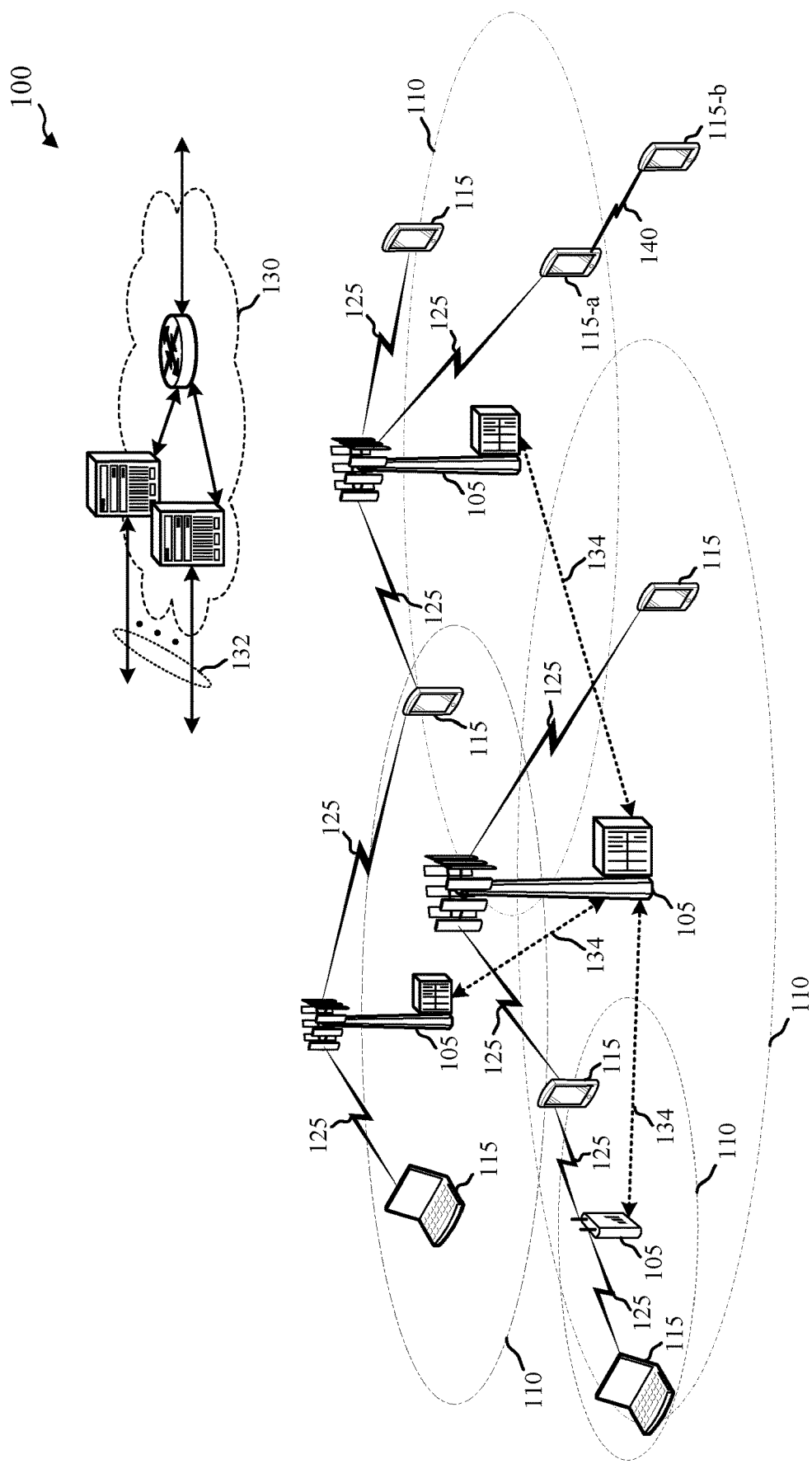
FIG. 1 shows a block diagram of a wireless communication system, in accordance with various aspects of the present disclosure.

Wireless devices (e.g., UEs) are for example mobile and may, at times, lose connection to a base station, which by extension disconnects the UE from accessing some network functions, e.g., accessing the internet, placing calls, etc. Existing ProSe services provides a mechanism for UEs to communicate directly with one another to exchange information, for example. A UE that has lost its connection with a base station may benefit from leveraging a ProSe connection as a relay. For example, an edge UE outside the coverage area of a base station may establish a ProSe connection with a neighboring UE in the coverage area of the base station. The neighboring UE (or relay UE) may provide a relay link to the edge UE that permits the edge UE to reconnect with the base station and, by extension, to network functions. Establishing a ProSe relay link between the edge UE and the relay UE, however, is different from establishing a more traditional ProSe connection between UEs and, therefore, may utilize signaling protocols unique to the relay requirement of the edge UE and configuration of the relay UE. Existing protocols do not support such relay link establishment. Moreover, the UEs may benefit from a protocol or stack that manages exchanges associated with establishing the ProSe relay link.

According to aspects of the present description, a ProSe protocol or stack may be established on UEs configured to support ProSe functions. The ProSe protocol may monitor, control, or otherwise manage one or more aspects of identifying a relay requirement for an edge UE and, in cooperation with a ProSe protocol of the relay UE, establish and maintain a ProSe relay link between the edge UE and the relay UE. The ProSe protocol may be a higher layer protocol, e.g., a L3 protocol established prior to a communication protocol that manages aspects of communicating a data exchange. The ProSe protocol may additionally manage various aspects associated with monitoring and maintaining the ProSe relay link, e.g., handling situations where the edge UE returns to a coverage area of a base station, where the relay UE leaves a coverage area of a base station, etc. The ProSe protocol may additionally, perform keep alive functions for the ProSe relay link. Accordingly, the ProSe protocol may provide edge UE with a ProSe signaling protocol that provides for connectivity, via a relay UE, to a UE that has lost its connection to a base station and the associated network functions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Additionally, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be for example used to describe the base stations 105, while the term UE may be for example used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell for example covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell alternatively may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations that may be approximately aligned in time. For asynchronous operation, the base stations may have different frame timing, and transmissions from different base stations that may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may additionally use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communications system 100, and each UE 115 may be stationary or mobile. A UE 115 may additionally include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may additionally be called forward link transmissions while the uplink transmissions may additionally be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency-division duplexing (FDD) operation (e.g., using paired spectrum resources) or time-division duplexing (TDD) operation (e.g., using unpaired spectrum resources). Frame structures for FDD (e.g., frame structure type 1) and TDD (e.g., frame structure type 2) may be defined.

In some examples of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may additionally be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support ProSe functions. For example, one or more UEs 115 may include a ProSe protocol stack operating at the non-access stratum (NAS) layer along with one or more other data protocols, e.g., prior to the access stratum (AS) layer including radio access network protocols. The UEs 115 including the ProSe protocol may support relay link functionality to provide network services to a UE 115 that has lost its connection to a base station 105, e.g., left the coverage area 110 of the base station 105. As illustrated in wireless communications system 100, a relay UE 115-a may provide a ProSe relay link to an edge UE 115-b via a communication link 140. The communication link 140 may be a PC5 communication reference point. Each of UE 115-a and UE 115-b may include a ProSe protocol stack that manages various aspects of establishing and maintaining the ProSe relay link. For example, the UE 115-b may identify or otherwise determine that it has a relay requirement. The relay requirement may be based on the UE 115-b receiving data in a buffer for transmission while, the UE 115-b is not coupled with a base station 105. The UE 115-b may perform a ProSe discovery procedure to identify neighboring UEs 115 that may serve as a relay UE 115. Once the edge UE 115-b has discovered and selected the relay UE 115-a, the ProSe protocols on the respective UEs 115-a and 115-b may establish a relay link via communication link 140 between the edge UE 115-b and the relay UE 115-a. The relay link may be based, at least in part, on the relay requirement of the edge UE 115-b, e.g., one or more aspects of the resources allocated to the relay link may be determine based on the nature of the relay requirement.

Figure 2:
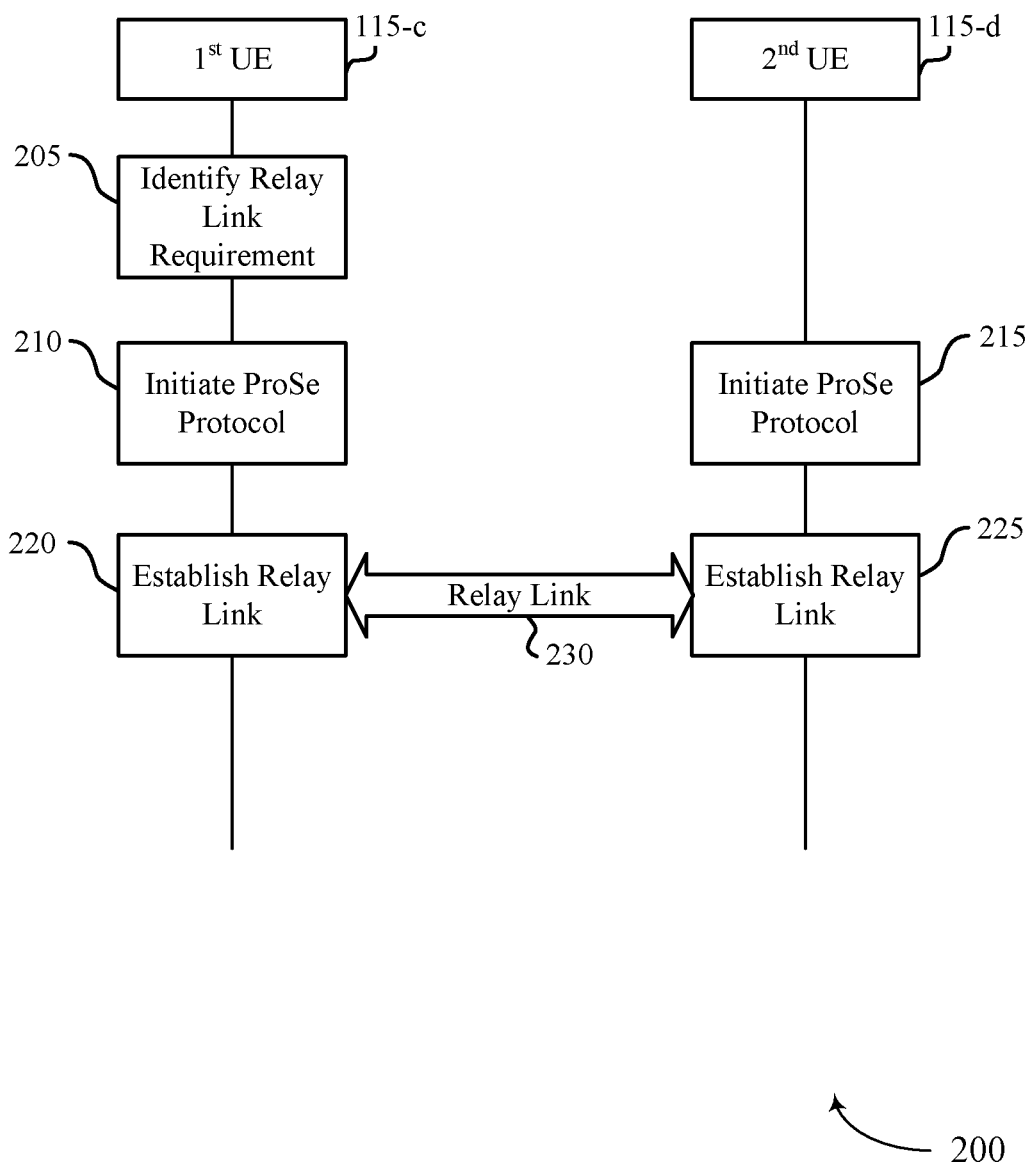
FIG. 2 shows a swim diagram illustrating aspects of proximity service signaling protocols in wireless communication, in accordance with various aspects of the present disclosure.

FIG. 2 is a swim diagram 200 illustrating aspects of ProSe signaling protocol operations, in accordance with various aspects of the present disclosure. The diagram 200 may illustrate aspects of the wireless communications system 100 described with reference to FIG. 1. The diagram 200 includes a first UE 115-c and a second UE 115-d. The first UE 115-c and/or the second UE 115-d may be examples of one or more of the UEs 115 described above with respect to FIG. 1. The first UE 115-c may be an edge UE and the second UE 115-d may be a relay UE. For example, the diagram 200 illustrates aspects of implementing ProSe signaling protocols for relay operations in wireless communication systems. In some examples, a system device, such as one of the UEs 115 may execute one or more sets of codes to control the functional elements of the device to perform some or all of the functions described below.

At block 205, the first UE 115-c may identify a relay link requirement. The relay link requirement may be for a wireless relay link with another UE (e.g., the second UE 115-d) to access various network functions. In some aspects, the relay link requirement may be triggered or otherwise identified based on a need for the first UE 115-c to access network functions. For example, a user of the first UE 115-c may open an application to access the network or to send data. Accordingly, the relay link requirement may include various attributes based on the nature of the desired application or function. Example attributes may include, but are not limited to, an amount of data to be transmitted (e.g., a buffer status report), a type of data or information to be transmitted, a time period associated with a transmission, etc.

At block 210, the first UE 115-c may initiate a ProSe protocol. Correspondingly, at block 215 the second UE 115-d may additionally initiate a ProSe protocol. The ProSe protocol or stack may be initiated between the first UE 115-c and the second UE 115-d and may be based, at least in part, on the relay link requirement. For example, the ProSe protocols may be initiated once the first UE 115-c discovers and selects the second UE 115-d to provide a ProSe relay link. As discussed, the ProSe protocol may be a higher layer protocol and initiated prior to a communication protocol stack associated with communicating a data exchange between the first UE 115-c and the second UE 115-d. The ProSe protocol may be a part of the user plane (U-Plane) on the first UE 115-c and the second UE 115-d. The ProSe protocol may be carried over a lower layer protocol, e.g., the PDCP stack. In some examples, data associated with the ProSe protocol may be identified by a PDCP data unit type field, e.g., service data unit (SDU) and/or protocol data unit (PDU) type field. Accordingly, traffic carried over the PDCP layer may be identified as ProSe protocol traffic and distinguishable from other application protocol traffic.

At blocks 220 and 225, the first UE 115-c and the second UE 115-d may establish a wireless relay link 230. The wireless relay link may be established via the ProSe protocols of the respective UEs and may be based, at least in some aspects, on the relay requirement of the first UE 115-c. For example, resources associated with the relay link may be based on the nature of the relay link, e.g., bandwidth requirement, throughput requirement, priority of the communications, etc. The wireless relay link may be a PC5 relay link. As will be described in greater detail below, establishing the wireless relay link may include exchanging various messages between the first UE 115-c and the second UE 115-d.

Figure 3:
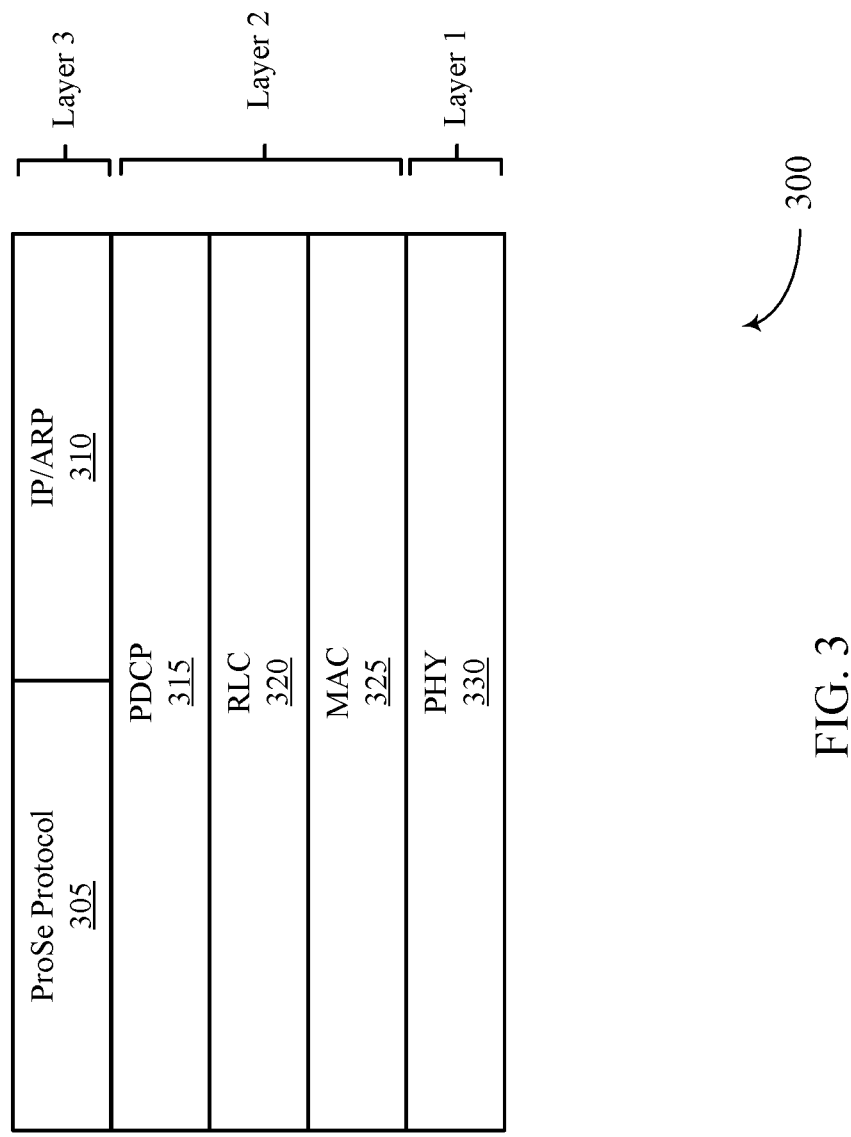
FIG. 3 shows a diagram of aspects of an example proximity service protocol for use in wireless communication, in accordance with various aspects of the present disclosure.

FIG. 3 shows a diagram 300 of aspects of an example of aspects of a ProSe protocol for use in wireless communication, in accordance with various aspects of the present disclosure. The diagram 300 may illustrate aspects of the wireless communications system 100 described with reference to FIG. 1. For example, diagram 300 illustrates an example of one or more aspects of a layer structure for an edge UE and/or a relay UE configured to support ProSe functionality. In some examples, a system device, such as one or more UEs 115 described with reference to FIGS. 1 and/or 2, may execute one or more sets of codes to control the functional elements of the device to perform some or all of the functions illustrated with respect to diagram 300.

As previously discussed, communication networks that may accommodate some of the various disclosed examples may be packet-based networks that operate according to a layered protocol stack. For example and starting at layer 3, a UE may include a ProSe protocol 305 and an internet protocol/address resolution protocol (IP/ARP) 310. For example, the ProSe protocol 305, the IP/ARP 310, as well as one or more other protocols (not shown) may be considered the user plane, NAS, etc., for the UE and may output packet-based traffic to lower layers.

At layer 2, the UE may include a PDCP layer 315, a RLC layer 320, and a MAC layer 325. Communications at the bearer or PDCP layer 315 may be IP-based. The RLC layer 320 may perform packet segmentation and reassembly to communicate over logical channels. The MAC layer 325 may perform priority handling and multiplexing of logical channels into transport channels. The MAC layer 325 may additionally use HARQ to provide retransmission at the MAC layer 325 to improve link efficiency. At layer 1, the UE may include a physical (PHY) layer 330 where the transport channels may be mapped to Physical channels.

The ProSe protocol 305 may monitor, control, or otherwise manage one or more aspects of ProSe functionality for the UE. For example, the ProSe protocol 305 may manage one or more aspects of establishing and maintaining a wireless relay link for a UE. The ProSe protocol 305 may provide higher layer functionality for the wireless relay link. Traffic associated with the ProSe protocol 305 may include a ProSe type field that identifies and separates the traffic from other layers, e.g., the IP/ARP layer 310. Accordingly, the ProSe type field may provide routing functionality for the ProSe protocol 305 traffic.

Figure 4:
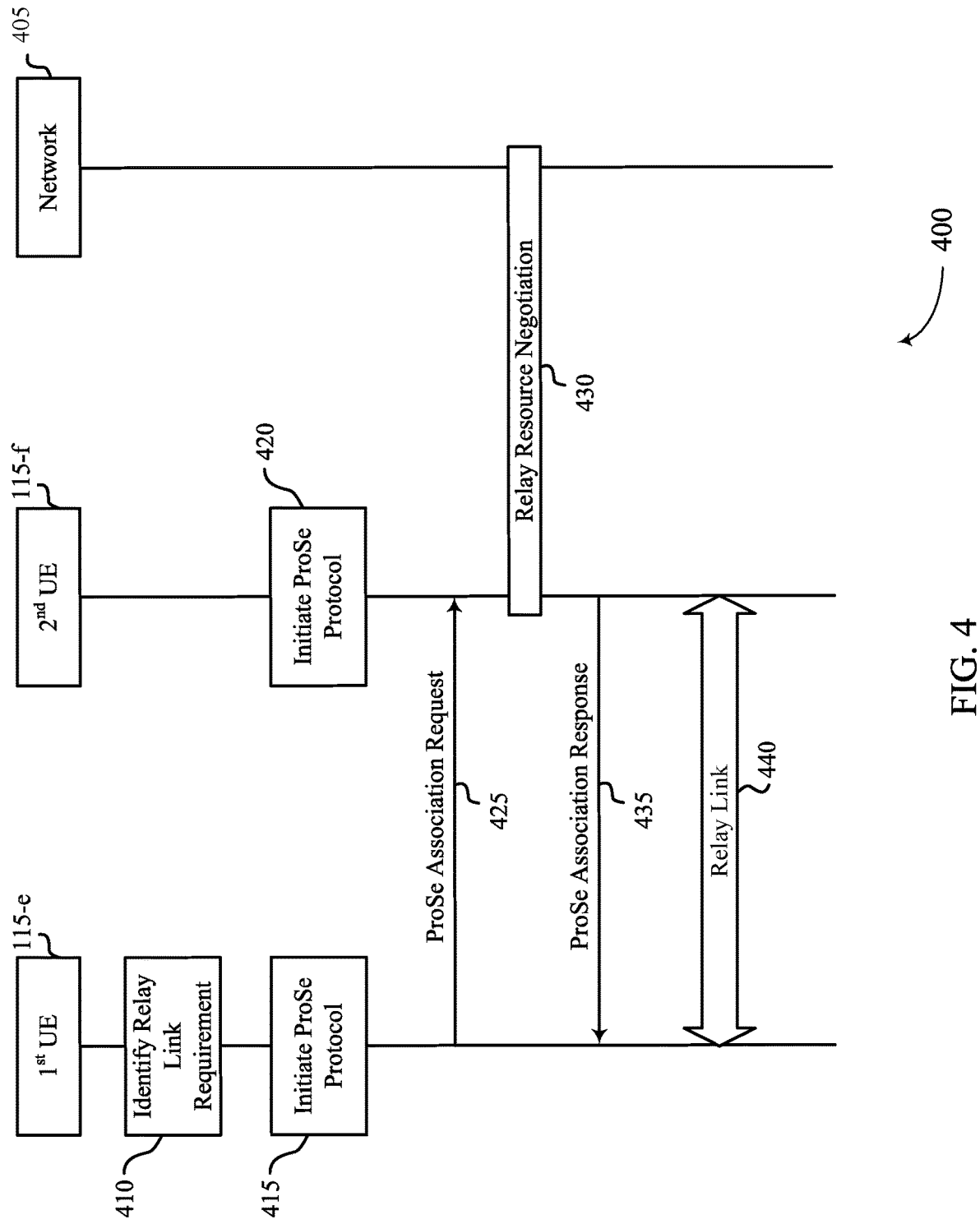
FIG. 4 shows a diagram of aspects of proximity service signaling protocols for use in wireless communication, in accordance with various aspects of the present disclosure.

FIG. 4 is a swim diagram 400 illustrating aspects of ProSe signaling protocol operations, in accordance with various aspects of the present disclosure. The diagram 400 may illustrate aspects of the wireless communications system 100 described with reference to FIG. 1. The diagram 400 includes a first UE 115-*e*, a second UE 115-*f*, and a network 405. The first UE 115-*e* and/or the second UE 115-*f* may be examples of one or more of the UEs 115 described above with respect to FIG. 1. The first UE 115-*e* may be an edge UE and the second UE 115-*f* may be a relay UE. The network 405 may be an example of the core network 130 described above with respect to FIG. 1. For example, the diagram 400 illustrates aspects of implementing ProSe signaling protocols for relay operations in wireless communication systems. In some examples, a system device, such as one of the UEs 115 may execute one or more sets of codes to control the functional elements of the device to perform some or all of the functions described below.

At block 410, the first UE 115-*e* may identify a relay link requirement. The relay link requirement may be for a wireless relay link with another UE (e.g., the second UE 115-*f*) to access various network functions. In some aspects, the relay link requirement may be triggered or otherwise identified based on a need for the first UE 115-*e* to access network functions. For example, a user of the first UE 115-*e* may open an application to access the network or to send data. Accordingly, the relay link requirement may include various attributes based on the nature of the desired application or function.

At block 415, the first UE 115-*e* may initiate a ProSe protocol. Correspondingly, at block 420 the second UE 115-*f* may additionally initiate a ProSe protocol. The ProSe protocol or stack may be initiated between the first UE 115-*e* and the second UE 115-*f* and may be based, at least in part, on the relay link requirement. For example, the ProSe protocols may be initiated once the first UE 115-*e* discovers and selects the second UE 115-*f* to provide a ProSe relay link. As discussed, the ProSe protocol may be a higher layer protocol and initiated prior to a communication protocol stack associated with communicating a data exchange between the first UE 115-*e* and the second UE 115-*f*.

At 425, the first UE 115-*e* may send a ProSe association request message to the second UE 115-*f*. The ProSe association request message may include information indicative of a request an association to be established with the second UE 115-*f*. For example, the association establishment may additionally include a security setup and/or mutual authentication of the first UE 115-*e* and the second UE 115-*f*. Although diagram 400 shows the ProSe association request message being sent from the first UE 115-*e* to the second UE 115-*f*, it can be appreciated that in other examples the second UE 115-*f* may send the ProSe association request message to the first UE 115-*e*. For example, in a network assisted technique (e.g., where the network 405 has information destined for the first UE 115-*e*), the network 405 may instruct the second UE 115-*f* to send the ProSe association request message to initiate the relay link establishment to convey the information.

In some aspects, the ProSe association request message is addressed to a L2 identity (ID) of the second UE 115-*f*. For example, during the ProSe discovery procedure where the first UE 115-*e* discovers and selects the second UE 115-*f* for ProSe relay services, the UEs may exchange L2 ID information. The first UE 115-*e* may use this L2 ID information to derive or otherwise determine the corresponding MAC destination address and/or physical layer ID to use when sending the ProSe association request message. In a network assisted example where the second UE 115-*f* sends the ProSe association request message, the L2 ID information associated with the first UE 115-*e* may be used to address the ProSe association request message.

In some aspects, the ProSe association request message sent from the first UE 115-*e* may include one or more of the following: a message type field set to association request; a command field set to association, disassociation, update, switch, etc.; a first UE 115-*e* identify field set to a L2 ID of the first UE 115-*e* used for ProSe direct communications; a service layer Information field, e.g., public land mobile network (PLMN) ID, access point name (APN), communication groups, quality-of-service (QoS) requirements, etc.; a security materials field, e.g., the first UE 115-*e* identifier that may be used for authentication with the second UE 115-*f* and/or network 405, authentication mechanisms, supported security protection mechanisms, keying materials, etc.; optionally IP configuration parameters, e.g., IP address currently used by the first UE 115-*e*, IP mobility scheme supported, IP versions supported, IP allocation mechanism to be used, etc.; optionally, history information parameters, e.g., previous eNB information, or previous Relay information, etc.; optionally, a transaction ID, e.g., for use when supporting multiple simultaneous ProSe association request transactions between the first UE 115-*e* and the second UE 115-*f*. For example, the transaction ID may be useful when the first UE 115-*e* and/or the second UE 115-*f* initiates a new ProSe protocol message when the first transaction is not yet finished. For the second UE 115-*f*, the first UE 115-*e* L2 ID and the transaction ID may uniquely identify an association control process.

In some aspects, the ProSe association request message sent from the second UE 115-*f* may include one or more of the following: a message type field set to association request; a command field set to association, disassociation, update, switch, and the like; a relay identify, e.g., L2 ID of the second UE 115-*f* for ProSe Direct Communication; a service layer information, e.g., PLMN IDs, APN, Communication Groups, QoS supported, etc.; a security materials information, e.g., similar to the information described with respect to the first UE 115-*e* case; a link identifier field; optionally an IP configuration parameters, e.g., similar to the information described with respect to the first UE 115-*e* case; optionally a transaction ID field; optionally a reason for the command, e.g., why the second UE 115-*f* is disassociating/updating the first UE 115-*e*. This may trigger the first UE 115-*e* to perform corresponding operation, e.g., relay UE selection, etc. Additionally, the ProSe association request message may optionally include the configurations for the follow up operations, e.g., authentication, keep alive configurations, etc.

At block 430, the second UE 115-*f* may perform various relay resource negotiations with the network 405. For example, the relay resource negotiations may include various operations for the second UE 115-*f* to prepare its connection to the network for serving the first UE 115-*e*. The relay resource negotiations by the second UE 115-*f* and the network 405 may be based, at least in part, on the information conveyed in the ProSe association request message. An example of a negotiation operation may include the second UE 115-*f* establishing a new connection to a packet data network (PDN), which provides a gateway function to allocate IP addresses and acts as an anchor for U-Plane mobility, to serve the first UE 115-*e*. For example, the second UE 115-*f* may establish the new PDN connection if it does not have a PDN connection that can serve the access point name (APN) which is for example responsible for connectivity requests, indicated by the first UE 115-*e* in the ProSe Association Request;

Another example of a negotiation operation may include the second UE 115-*f* adjusting its QoS configuration associated with the current radio bearers in order to meet the relay requirements of the first UE 115-*e*, in addition to the second UE's 115-*f* current traffic requirements. In an example negotiation operation may include the second UE 115-*f* indicating to network, e.g., eNB, that it is starting to serve the first UE 115-*e* as a relay and that corresponding scheduling should be arranged. In some aspects, the second UE 115-*f* may indicate to the eNB how many edge UEs per group are associated with the relay. Yet another example of a negotiation operation may include the second UE 115-*f* obtaining some security materials in order to authenticate the first UE 115-*e* and/or establish the security for the communication between first UE 115-*e* and the second UE 115-*f*.

At 435, the second UE 115-*f* may send a ProSe association response message to the first UE 115-*e*. The ProSe association response message may include information indicative of the resources associated with the second UE 115-*f* providing relay services to the first UE 115-*e*, e.g., one or more aspects of the relay resources negotiated with the network 405. The ProSe association response message may convey an indication that the second UE 115-*f* is able and configured to support the wireless relay link for the first UE 115-*e*.

In some aspect, the ProSe association response message may include one or more of the following: a message type field set to association response; a result field, e.g., success/failure and the corresponding reason codes such as failure of authentication, or insufficient resources, etc.; a command field, e.g., security up, disassociation, update, or switch to another Relay UE, etc.; a first UE 115-*e* identify or a second UE 115-*f* identity; a service layer information, e.g., PLMN ID, APN, Communication Groups, QoS requirements, etc.; a security materials, e.g., for finishing the authentication or for setup the security protection for the following data traffic. The ProSe association response message may optionally include one or more of the following: an IP configuration parameters, e.g., IP address currently used by the first UE 115-*e*, IP mobility scheme supported, IP versions supported, IP allocation mechanism to be used, etc.; a transaction ID; a follow up operation parameters, e.g., keep alive message configurations, a new link identifier for the first UE 115-*e*, etc.

Although not shown in FIG. 4, there may additionally be one or more follow up messages exchanged between the first UE 115-*e* and the second UE 115-*f* in between the ProSe association request message and the ProSe association response message. For example, follow up messages may be exchanged in order to support security operations (e.g., authentication procedures) to confirm establishment of the ProSe association.

In some aspects, a follow up message may include one or more of the following: a message type field set to association follow up; a command field, e.g., additional follow up, last message, etc.; a first UE 115-*e* identify or a second UE 115-*f* identity; optionally a service layer information; optionally, a security materials, e.g., for the mutual authentication and establishment of security contexts; optionally, an IP configuration parameters; optionally, a transaction ID.

At blocks 440, the first UE 115-*e* and the second UE 115-*f* may establish a wireless relay link. The wireless relay link may be established via the ProSe protocols of the respective UEs and may be based, at least in some aspects, on the relay requirement of the first UE 115-*e*. For example, resources associated with the relay link may be based on the nature of the relay link, e.g., bandwidth requirement, throughput requirement, priority of the communications, etc. These resources may be negotiated between the second UE 115-*f* and the network 405. The wireless relay link may be a PC5 relay link.

In some aspects, the first UE 115-*e* (or the second UE 115-*f* in some situations) may use a similar procedure to delete the association and wireless relay link with the second UE 115-*f* when it does not need it anymore, e.g., when the first UE 115-*e* selects a different relay UE, when the first UE 115-*e* moves back into network coverage, or when the application closes, etc. In these cases, the first UE 115-*e* may indicate in the ProSe Association Request message that it intends to remove the association and, therefore, tear down the wireless relay link. This may trigger the second UE 115-*f* to adjust its states or the connection with the network 405 accordingly (e.g., a reverse of the relay resource negotiation carried out when the second UE 115-*f* received the ProSe association request).

Figure 5:
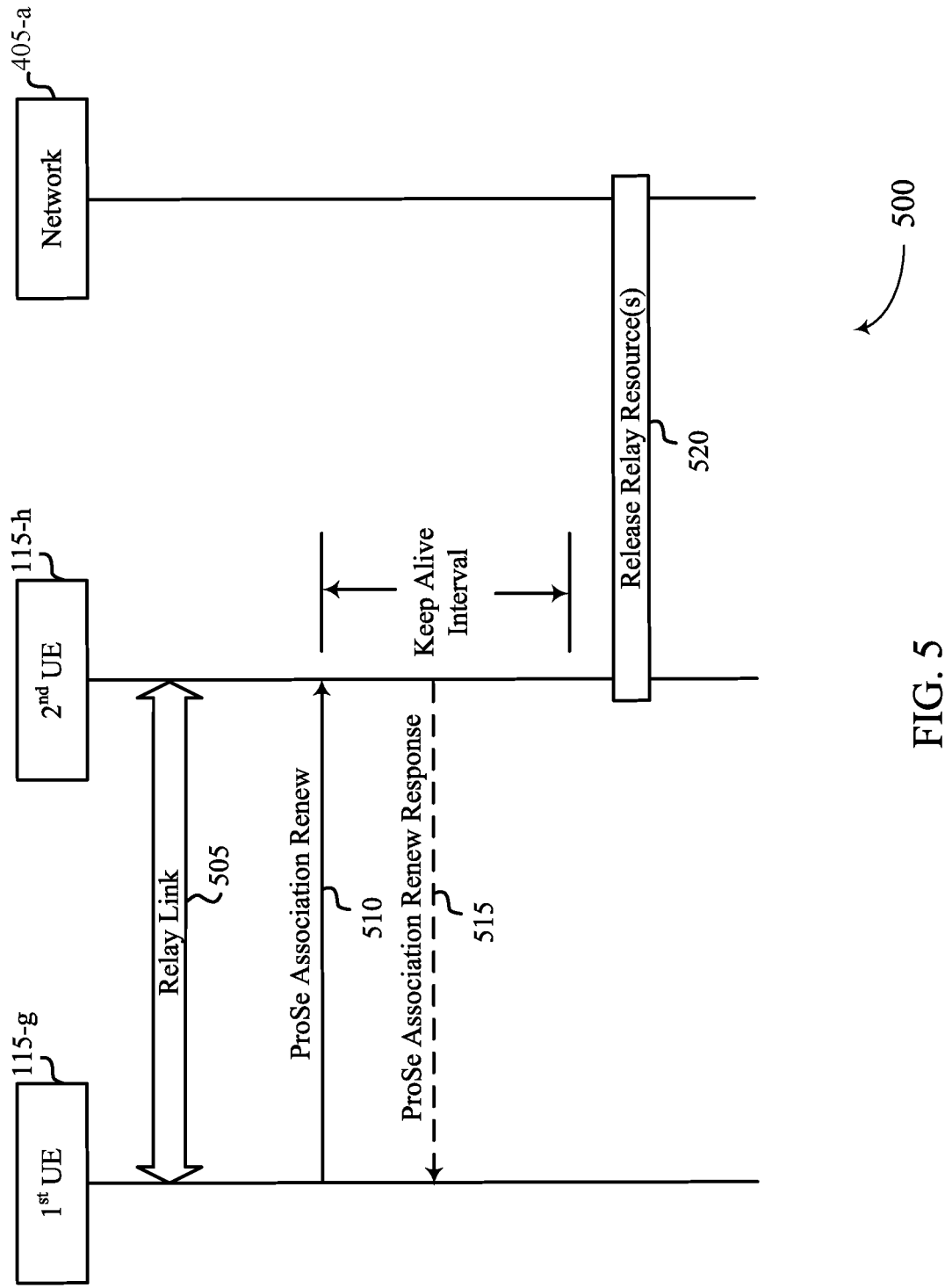
FIG. 5 shows a swim diagram illustrating aspects of proximity service signaling protocols for use in wireless communication, in accordance with various aspects of the present disclosure.

FIG. 5 is a swim diagram 500 illustrating aspects of ProSe signaling protocol operations, in accordance with various aspects of the present disclosure. The diagram 500 may illustrate aspects of the wireless communications system 100 described with reference to FIG. 1. The diagram 500 includes a first UE 115-*g*, a second UE 115-*h*, and a network 405-*a*. The first UE 115-*g* and/or the second UE 115-*h* may be examples of one or more of the UEs 115 described above with respect to FIG. 1. The first UE 115-*g* may be an edge UE and the second UE 115-*h* may be a relay UE. The network 405-*a* may be an example of the core network 130 described above with respect to FIG. 1. For example, the diagram 500 illustrates aspects of implementing ProSe signaling protocols for relay operations in wireless communication systems. In some examples, a system device, such as one of the UEs 115 may execute one or more sets of codes to control the functional elements of the device to perform some or all of the functions described below.

At 505, the first UE 115-*g* and the second 115-*h* may have a wireless relay link 505 established. The wireless relay link may be established using any of the described ProSe signaling protocols, e.g., may be established using the ProSe protocol of the first UE 115-*g* and second UE 115-*h*.

For example, the first UE 115-*g* and/or the second UE 115-*h* may be configured to perform various functions to maintain the wireless relay link. Such keep alive or relay state functions may provide for ensuring that the wireless relay link is maintained when needed and/or torn down when not. For example, to address the situation where the first UE 115-*g* may move out of range of the second UE 115-*h*, the second UE 115-*h* may need to keep some relay state information regarding the first UE's 115-*g* association, such that it may be able to manage the corresponding resources for serving the first UE 115-*g*, e.g., the backhaul bandwidth reservation, IP address, etc. Accordingly, at 510, the first UE 115-*g* may periodically send a keep alive message, e.g., ProSe association renew message, to the second UE 115-*h*. The configuration regarding sending the ProSe association renew message may be determined and indicated in the ProSe association response message (when the association is initiated by the second UE 115-*h*), or in the ProSe association request message (when the association is initiated by the first UE 115-*g*). A component of the configuration may include a keep alive interval where the ProSe association renew message may be sent within.

At 515, the second UE 115-*h* may optionally send a ProSe association renew response message to the first UE 115-*g*. The ProSe association renew response message may convey an indication that the second UE 115-*h* may continue to provide the relay link to the first UE 115-*g*. In some aspects, the ProSe association renew response message may include or otherwise convey an indication of any changed resources associated with the wireless relay link.

If no ProSe association renew message is received from the first UE 115-*g* within the keep alive interval, at block 520 the second UE 115-*h* may perform negotiation operations with the network 405-*a* to release the resources associated with the wireless relay link.

In some aspects, the described keep alive message may be sent from both sides, e.g., from the first UE 115-*g* and from the second UE 115-*h*. There may be configured (or preconfigured) a keep alive timer associated with sending and/or receiving the keep alive message. From the perspective of a UE sending the keep alive messages, the keep alive internal timer may be re-started after every successful transmission of data packet or the ProSe protocol signaling message. The keep alive interval timer may be started/reset after sending each packet and, when the timer expires, a keep alive message may be sent. From the perspective of the UE receiving the keep alive messages, a keep alive interval timer can be reset whenever a packet is received. If that keep alive interval timer expires, i.e., if a keep alive message is not received, that UE may perform various actions associated with a link failure/out of coverage event, e.g., release resources associated with the wireless relay link.

Figure 6:
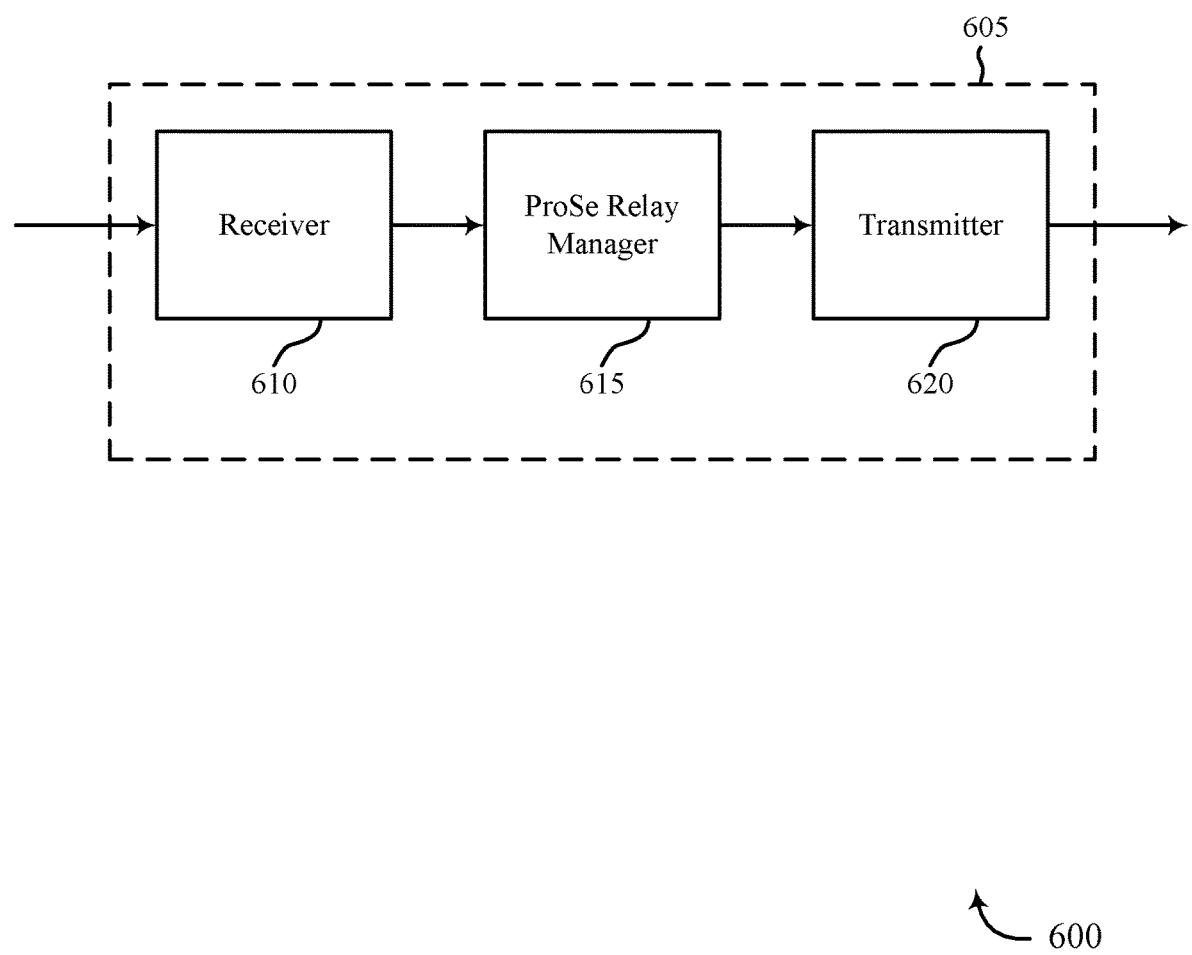
FIG. 6 shows a block diagram of a device configured for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115 (e.g., an edge or first UE and/or a relay or second UE) described with reference to FIGS. 1, 2, 4, and/or 5. In some examples, the device 605 may implement one or more aspects of the features described with reference to FIG. 3. The device 605 may include a receiver 610, a ProSe relay manager 615, and/or a transmitter 620. The device 605 may additionally, be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may additionally be implemented, in whole or in part, with instructions embodied in a memory, formatted to be executed by one or more general or application-specific processors.

The receiver 610 may receive information such as packets, user data, and/or control information associated with various information channels (e.g., control channels, data channels, etc.). The receiver 610 may be configured to receive transmissions associated with ProSe services (e.g., transmissions associated with a ProSe discovery procedure, a ProSe association process, a wireless relay link, etc.). Information may be passed on to the ProSe relay manager 615, and to other components of the device 605.

The ProSe relay manager 615 may monitor, control, or otherwise manage one or more aspects of establishing and maintaining a wireless relay link for ProSe operations for the device 605. In some examples, the ProSe relay manager 615 may, alone or in cooperation with other components of the device 605, identify a wireless relay requirement associated with the device 605. The wireless relay requirement may be based on the device 605 having no direct connection to a base station and having information to transmit or receive. The ProSe relay manager 615 may establish, utilize, otherwise initiate a ProSe protocol between the device 605 and a second wireless device (e.g., a relay device) based, at least in part, on the wireless relay link requirement. The ProSe protocol may be initiated prior to an initiation of a communication data exchange between the device 605 and the second wireless device. The ProSe protocol may be managed and/or implemented as a L3 stack on the device 605. The ProSe relay manager 615 may establish, using the ProSe protocol, a relay link between the device 605 and the second wireless device based, at least in part, on the identified wireless relay requirement. For example, the wireless relay link may be associated with various resources determined based on the relay link requirement.

The transmitter 620 may transmit the one or more signals received from other components of the device 605. The transmitter 620 may transmit one or more messages associated with ProSe services for the device, e.g., a ProSe association request message, one or more ProSe follow up messages, a ProSe association response messages, various state maintenance/keep alive messages, etc., for the device 605. In some examples, the transmitter 620 may be collocated with the receiver 610 in a transceiver.

Figure 7:
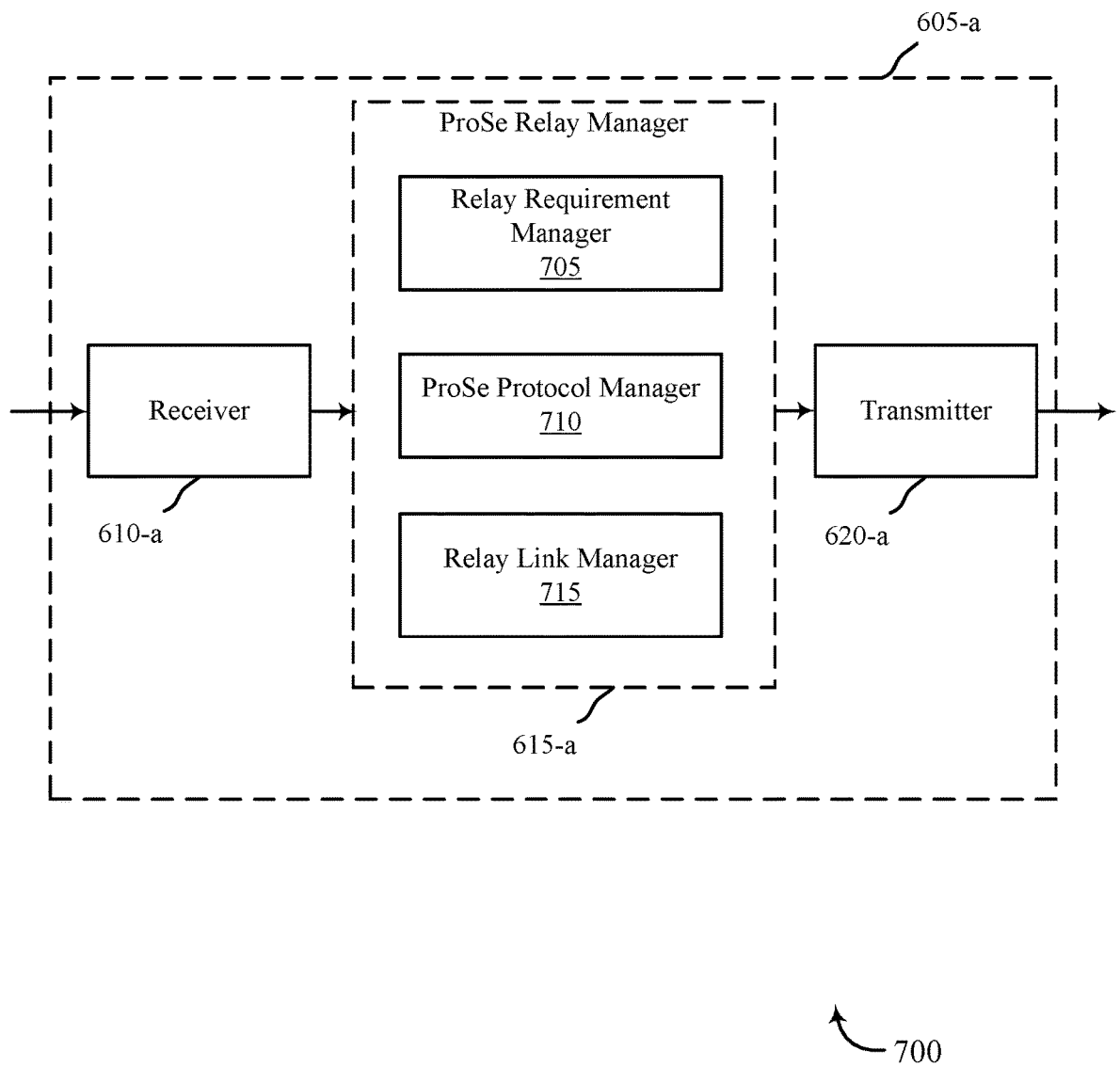
FIG. 7 shows a block diagram of a device configured for use in wireless communication, in accordance with various aspects of the present disclosure.

FIG. 7 shows a block diagram 700 of a device 605-*a* for use in wireless communication, in accordance with various examples. The device 605-*a* may be an example of one or more aspects of a UE 115 (e.g., an edge or first UE and/or a relay or second UE) described with reference to FIGS. 1, 2, 4, and/or 5. It may additionally, be an example of a device 605 described with reference to FIG. 6. In some examples, the device 605-*a* may implement one or more aspects of the features described with reference to FIG. 3. The device 605-*a* may include a receiver 610-*a*, a ProSe relay manager 615-*a*, and/or a transmitter 620-*a*, which may be examples of the corresponding modules of device 605. The device 605-*a* may additionally include a processor (not shown). Each of these components may be in communication with each other. The ProSe relay manager 615-*a* may include a relay requirement manager 705, a ProSe protocol manager 710, and/or a relay link manager 715. The receiver 610-a and the transmitter 620-a may perform the functions of the receiver 610 and the transmitter 620, of FIG. 6, respectively.

The relay requirement manager 705 may monitor, control, or otherwise manage one or more aspects of identifying a wireless relay requirement for the device 605-a. For example, the relay requirement manager 705 may identify a wireless relay requirement associated with the device 605-a. The wireless relay requirement may be based on the device 605-a or may be based on information received from a neighboring ProSe UE. For example, the device 605-a may receive data or information in its buffer for transmission. The device 605-a may determine that it is not coupled with a base station, e.g., has left the coverage area of the base station or otherwise lost connection. As another example, the relay requirement manager 705 may identify the relay requirement based on information received from a neighboring ProSe UE indicating that it (or the network) has traffic to be delivered to the device 605-a. Accordingly, the relay requirement manager 705 may determine that a relay is required and any associated requirement for the relay, e.g., bandwidth, throughput, QoS requirements, etc.

In some aspects, the relay requirement manager 705 may, alone or in cooperation with other components of the device 605-a, determine that the device 605-a has left and/or entered a coverage area of at least one base station. For example, aspects of the relay requirement may be based on whether the device 605-a is coupled with a base station and therefore able to utilize the base station for communication purposes. When the device 605-a is not coupled with a base station, the relay requirement may be indicated to satisfy the communications.

The ProSe protocol manager 710 may monitor, control, or otherwise manage one or more aspects of a ProSe protocol for the device 605-a. For example, the ProSe protocol manager 710 may initiate a ProSe protocol between the device 605-a and a second wireless device based at least in part on the identified wireless relay requirement. The ProSe protocol may be initiated prior to an initiation of a communication data exchange between the device 605-a and the second wireless device.

In some aspects, the ProSe protocol manager 710 may manage one or more message exchanges between the device 605-a and the second wireless device. The one or more message exchanges may be associated with a ProSe association process of the ProSe protocol. The ProSe protocol manager 710 may, alone or in cooperation with other components of the device 605-a, exchange the one or more messages with the second wireless device. The ProSe association process may be used to establish a wireless relay link between the device 605-a and the second wireless device. In some aspects, the ProSe protocol may be carried over a PDCP layer, e.g., the PDCP layer may receive SDUs from the ProSe protocol and output PDUs to the ProSe protocol. The traffic for the ProSe protocol may be identified based on a PDCP DU type associated with the ProSe protocol, e.g., a SDU type and/or a PDU type. For example, the PDCP DU type may identify the traffic as being associated with the ProSe protocol and therefore provide routing information to the lower layer protocol stacks.

In some aspects, the ProSe protocol manager 710 may manage one or more aspects of determining a relay state associated with the relay link for the device 605-a. For example, the ProSe protocol manager 710 may the keep alive or relay state functions based at least in part on the exchange of one or more messages between the device 605-a and the second wireless device. In some examples, a message (e.g., a ProSe association renew message) associated with determining the relay state may include an indication of one or more of a duration interval (or keep alive interval which indicates the periodicity of the ProSe association renew message transmission in order to consider the relay link active), or a link identifier parameter (e.g., a number used by the second wireless device to identify the association with the device 605-a), or an identifier information parameter (e.g., an identification parameter associated with the device 605-a), or a wireless medium information associated with the relay link (e.g., any radio related information for the device 605-a to send the ProSe association renew message in a particular band or using a particular resource), or any combination thereof. In an example, a ProSe association renew message may include, but is not limited to: a message type field set to association renew; a command field set to renew; an identification parameter of the second wireless device, a relay link identifier; a device 605-a identifier; a security material field (e.g., to protect the message and/or for authentication purposes), as well as a link status/quality indicator.

The relay link manager 715 may monitor, control, or otherwise manage one or more aspects of establishing a wireless relay link for the device 605-a. For example, the relay link manager 715 may establish, via the ProSe protocol manager 710, a relay link between the device 605-a and the second wireless device based at least in part on the identified wireless relay requirement. In some aspects, establishing the relay link may include sending a ProSe association request message. The ProSe association request message may include at least a message type parameter, or a command parameter, or a wireless device identity parameter, or a service layer information parameter, or a security information parameter, or an IP configuration parameter, or a historical parameter, or a transaction identifier parameters, or a link identifier parameter, or a reason parameter, or a follow-up parameter, or a combination thereof.

In some aspects, establishing the relay link may include receiving a ProSe association response message. The ProSe association response message may include at least a message type parameter, or a result parameter, or a command parameter, or a wireless device identity parameter, or a service layer information parameter, or a security information parameter, or an internet protocol (IP) configuration parameter, or a transaction identifier parameter, or a follow-up operation parameter, or a combination thereof.

In some aspects, the ProSe association request message may be sent from the device 605-a and the ProSe association response message may be received from the second wireless device, as described above. In other aspects, the ProSe association request message may be sent from the second wireless device and the ProSe association response message may be received from the device 605-a, e.g., in a network assisted procedure.

In some aspects, the relay link manager 715 may exchange one or more ProSe association follow-up messages to establish the relay link between the device 605-a and the second wireless device. The relay link manager 715 may, alone or in cooperation with the relay requirement manager 705, determine that the device 605-a has entered a coverage area of at least one base station, and send one or more messages to the second wireless device to terminate the relay link. Additionally or alternatively, the relay link manager 715 may, alone or in cooperation with other components of the device 605-a, receive a message from the second wireless device conveying an indication that the second wireless device has left a coverage area of at least one base station, and terminate the relay link based at least in part on the received message. In some examples, the messages may include at least a message type parameter, or a command parameter, or a wireless device identity parameter, or a reason parameter, or a transaction identifier parameter, or a combination thereof.

Figure 8:
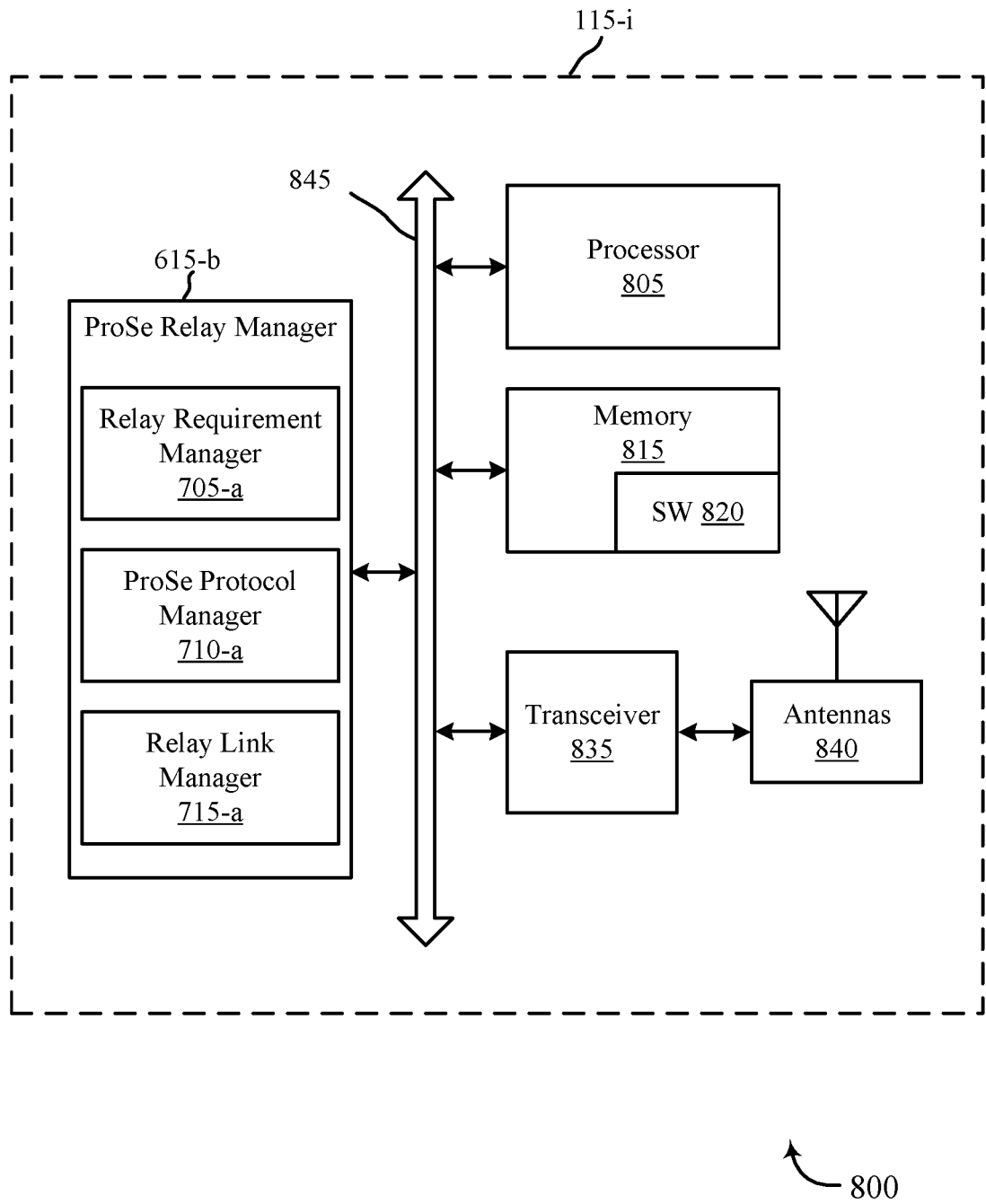
FIG. 8 shows a block diagram of a user equipment for use in wireless communications, in accordance with various aspects of the present disclosure.

FIG. 8 illustrates a block diagram of portions of a system 800 including a user equipment 115-*i* for use in wireless communication, in accordance with various aspects of the present disclosure. In some examples, the UE 115-*i* may be an example of the UEs 115 (e.g., an edge or first UE and/or a relay or second UE) described with respect to FIGS. 1, 2, 4, and 5, and/or devices 605 of FIGS. 6 and 7. UE 115-*i* may include a ProSe relay manager 615-*b* which may be an example of and perform the functions of the ProSe relay manager 615 described with respect to FIGS. 6 and 7. UE 115-*i* may include components for bi-directional voice and data communications including components for transmitting communications and components for receiving communications. For example, UE 115-*a* may communicate bi-directionally with base stations and/or other UEs.

UE 115-*i* may include a processor 805, and memory 815 (e.g., including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station or another UE. The transceiver 835 may include a modem to modulate the packets and provide the modulated packets to the antenna(s) 840 for transmission, and to demodulate packets received from the antenna(s) 840. While UE 115-*a* may include a single antenna 840, UE 115-*a* may additionally have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., signaling protocols for ProSe services, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

The ProSe relay manager 615-*b* may be configured to perform and/or control some or all of the features and/or functions described with reference to FIGS. 1-7 related to signaling protocols for ProSe operations for the UE 115-*i*. In some examples, the ProSe relay manager 615-*b* may identify a relay requirement for the UE 115-*i*, initiate a ProSe protocol between the UE 115-*i* and a second UE based on the relay link requirement, and establish a relay link between the UE 115-*i* and the second UE. The ProSe relay manager 615-*b*, or portions thereof, may include a processor, and/or some or all of the functions of the ProSe relay manager 615-*b* may be performed by the processor 805 and/or in connection with the processor 805. In some examples, the ProSe relay manager 615-*b* may be an example of the ProSe relay manager 615 described with reference to FIGS. 6, and/or 7. For example, the ProSe relay manager 615-*b* may include a relay requirement manager 705-*a*, a ProSe protocol manager 710-*a*, and/or a relay link manager 715-*a*, which may be examples of and perform the functions of the a relay requirement manager 705, the ProSe protocol manager 710, and/or the relay link manager 715, respectively, described with reference to FIG. 7.

Figure 9:
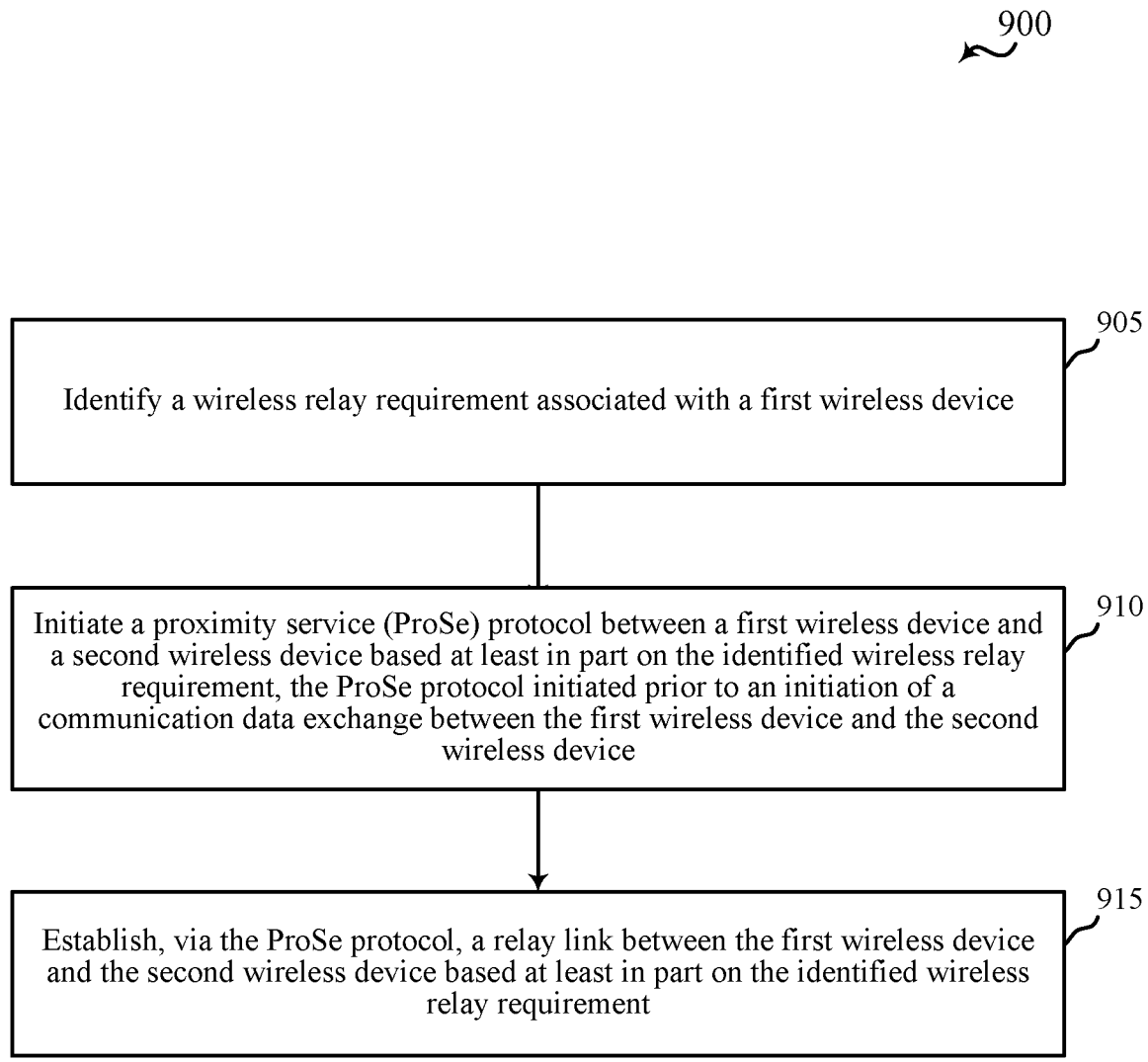
FIG. 9 is a flow chart illustrating an example of a method for wireless communication, in accordance with various aspects of the present disclosure.

FIG. 9 shows a flowchart illustrating a method 900 for wireless communications, in accordance with various aspects of the present disclosure. The operations of method 900 may be implemented by a UE 115 or its components, as described with reference to FIGS. 1-8. For example, the operations of method 900 may be performed by the ProSe relay manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 900 will be described with reference to a wireless device, such as a UE 115.

At block 905, the method 900 may include identifying a wireless relay requirement associated with a first wireless device. The relay requirement may be based at least in part on the first wireless device being outside the coverage area or otherwise not in communication with a base station and information being sent to or from the first wireless device. The wireless relay requirement may include information associated with the type of relay needed by the first wireless device, e.g., a bandwidth parameter, a throughput parameter, a QoS parameter, etc. The relay requirement may additionally include information indicative of the type and/or amount of data or information to be communicated via the wireless relay link.

At block 910, the method 900 may include initiating a proximity service (ProSe) protocol between the first wireless device and a second wireless device based, at least in part, on the identified wireless relay requirement. The ProSe protocol may be initiated prior to initiation of a communication data exchange between the first wireless device and the second wireless device. The ProSe protocol may be a L3 protocol stack and manage various aspects of ProSe services for the wireless devices.

At block 915, the method 900 may include establishing, via the ProSe protocol, a relay link between the first wireless device and the second wireless device based, at least in part, on the identified wireless relay requirement. The relay link may be a PC5 relay link between the first wireless device and the second wireless device. The relay link may be associated with non-persistent, semi-persistent, or a persistent assignment of resources for the relay link.

The operation(s) at blocks 905, 910, and/or 915 may be performed using the ProSe relay manager 615 described with reference to FIGS. 6-8.

Thus, the method 900 may provide for wireless communication. It should be noted that the method 900 is just one implementation and that the operations of the method 900 may be rearranged or otherwise modified such that other implementations are possible.

Figure 10:
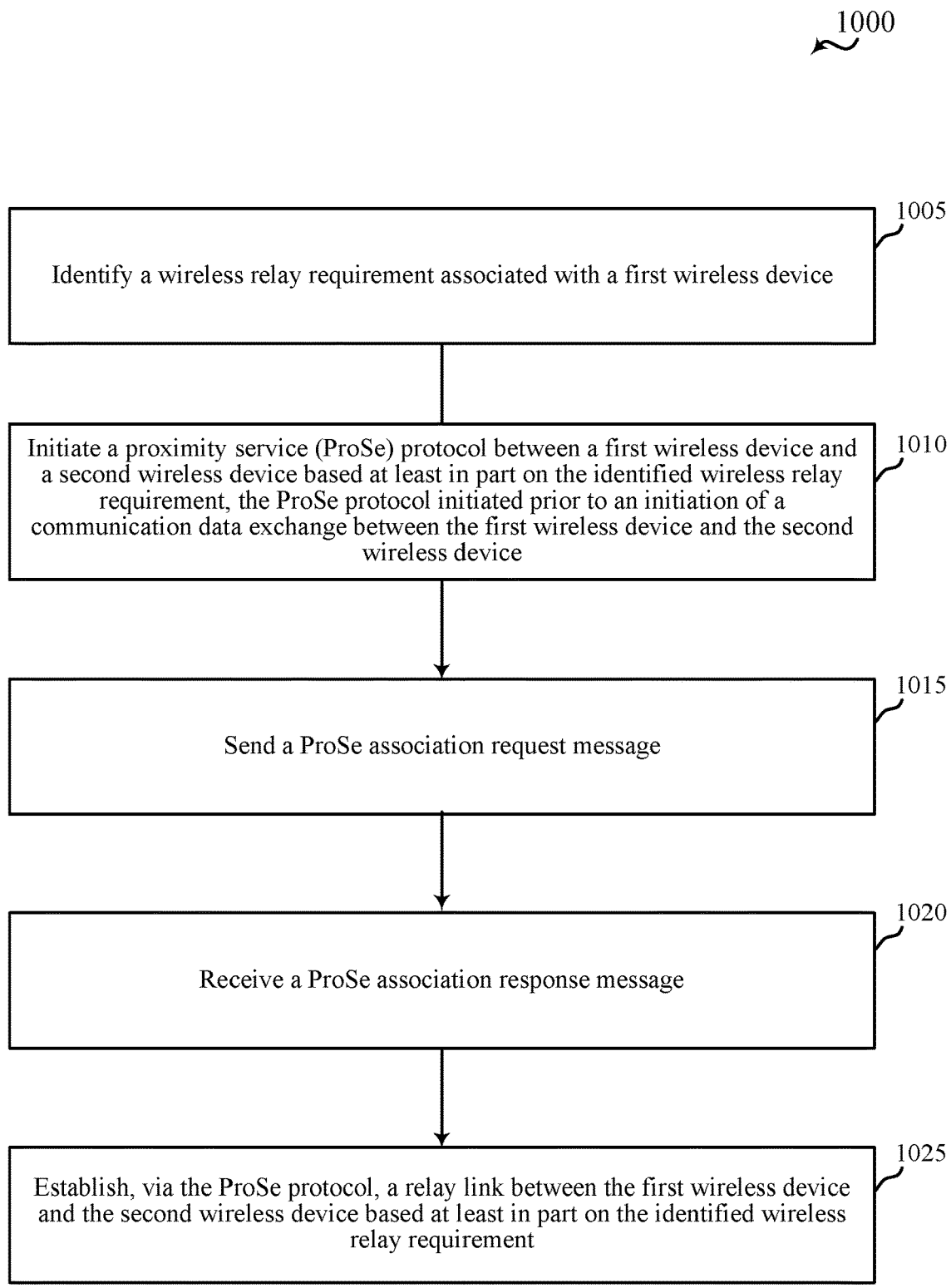
FIG. 10 is a flow chart illustrating another example of a method for wireless communication, in accordance with various aspects of the present disclosure.

FIG. 10 shows a flowchart illustrating a method 1000 for wireless communications, in accordance with various aspects of the present disclosure. The operations of method 1000 may be implemented by a UE 115 or its components, as described with reference to FIGS. 1-8. For example, the operations of method 1000 may be performed by the ProSe relay manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1000 will be described with reference to a wireless device, such as a UE 115.

At block 1005, the method 1000 may include identifying a wireless relay requirement associated with a first wireless device. The relay requirement may be based at least in part on the first wireless device being outside the coverage area or otherwise not in communication with a base station and information being sent to or from the first wireless device. The wireless relay requirement may include information associated with the type of relay needed by the first wireless device, e.g., a bandwidth parameter, a throughput parameter, a QoS parameter, etc. The relay requirement may additionally include information indicative of the type and/or amount of data or information to be communicated via the wireless relay link.

At block 1010, the method 1000 may include initiating a ProSe protocol between the first wireless device and a second wireless device based, at least in part, on the identified wireless relay requirement. The ProSe protocol may be initiated prior to initiation of a communication data exchange between the first wireless device and the second wireless device. The ProSe protocol may be a L3 protocol stack and manage various aspects of ProSe services for the wireless devices.

At block 1015, the method 1000 may include sending a ProSe association request message. The ProSe association request message may be sent from the first wireless device or from the second wireless device (in a network assisted ProSe procedure). The ProSe association request message may include various parameters and convey information associated with the type of relay requirement needed.

At block 1020, the method 1000 may include receiving a ProSe association response message. The ProSe association response message may be received from the first wireless device or from the second wireless device, respectively, as described with respect to block 1015. The ProSe association response message may convey an indication of resources associated with establishing a relay link to meet the wireless relay requirement.

At block 1025, the method 1000 may include establishing, via the ProSe protocol, a relay link between the first wireless device and the second wireless device based, at least in part, on the identified wireless relay requirement. The relay link may be a PC5 relay link between the first wireless device and the second wireless device. The relay link may be associated with non-persistent, semi-persistent, or a persistent assignment of resources for the relay link. The relay link may be established based, at least in part, on the ProSe association request/response messages.

The operation(s) at blocks 1005, 1010, 1015, 1020 and/or 1025 may be performed using the ProSe relay manager 615 described with reference to FIGS. 6-8.

Thus, the method 1000 may provide for wireless communication. It should be noted that the method 1000 is just one implementation and that the operations of the method 1000 may be rearranged or otherwise modified such that other implementations are possible.

Figure 11:
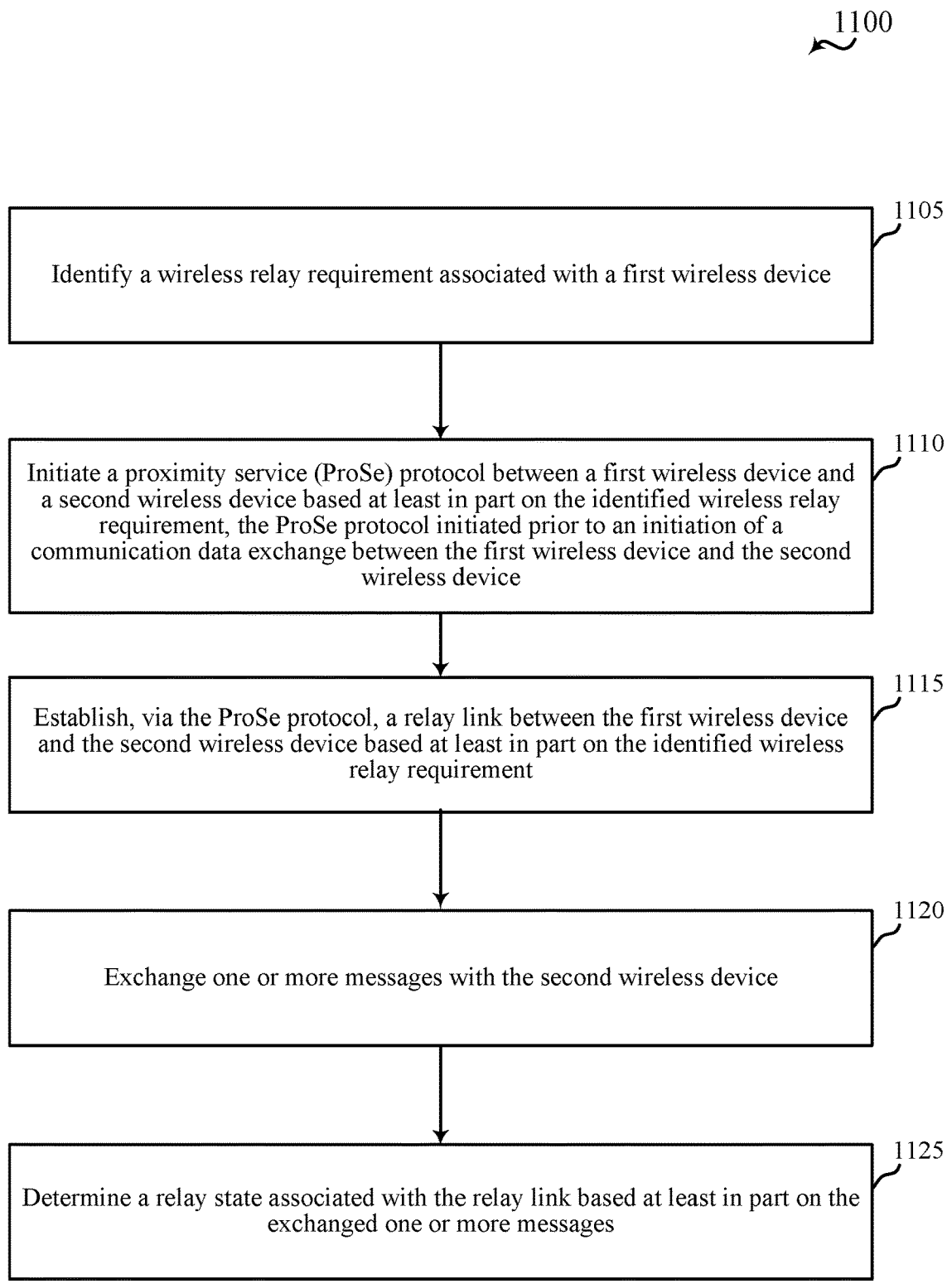
FIG. 11 is a flow chart illustrating another example of a method for wireless communication, in accordance with various aspects of the present disclosure.

FIG. 11 shows a flowchart illustrating a method 1100 for wireless communications, in accordance with various aspects of the present disclosure. The operations of method 1100 may be implemented by a UE 115 or its components, as described with reference to FIGS. 1-8. For example, the operations of method 1100 may be performed by the ProSe relay manager 615 as described with reference to FIGS. 6-8. In some examples, a UE 115 may execute a set of codes to control the functional elements of the UE 115 to perform the functions described below. Additionally or alternatively, the UE 115 may perform aspects the functions described below using special-purpose hardware. For convenience, the functions of the method 1100 will be described with reference to a wireless device, such as a UE 115.

At block 1105, the method 1100 may include identifying a wireless relay requirement associated with a first wireless device. The relay requirement may be based at least in part on the first wireless device being outside the coverage area or otherwise not in communication with a base station and information being sent to or from the first wireless device. The wireless relay requirement may include information associated with the type of relay needed by the first wireless device, e.g., a bandwidth parameter, a throughput parameter, a QoS parameter, etc. The relay requirement may additionally include information indicative of the type and/or amount of data or information to be communicated via the wireless relay link.

At block 1110, the method 1100 may include initiating a ProSe protocol between the first wireless device and a second wireless device based, at least in part, on the identified wireless relay requirement. The ProSe protocol may be initiated prior to initiation of a communication data exchange between the first wireless device and the second wireless device. The ProSe protocol may be a L3 protocol stack and manage various aspects of ProSe services for the wireless devices.

At block 1115, the method 1100 may include establishing, via the ProSe protocol, a relay link between the first wireless device and the second wireless device based, at least in part, on the identified wireless relay requirement. The relay link may be a PC5 relay link between the first wireless device and the second wireless device. The relay link may be associated with non-persistent, semi-persistent, or a persistent assignment of resources for the relay link. The relay link may be established based, at least in part, on the ProSe association request/response messages.

At block 1120, the method 1100 may include exchanging one or more messages with the second wireless device. The messages may be established as part of a keep alive feature where the current status and health of the relay link is monitored. The messages may be sent from the first wireless device and/or from the second wireless device. Transmission of the one or more messages may be associated with a keep alive interval clock operating on the first wireless device and/or the second wireless device. In some examples, a ProSe association renew message may be exchanged with a ProSe association renew response message being options.

At block 1125, the method 1100 may include determining a relay state associated with the relay link based, at least in part, on the exchanged one or more messages. In some examples, the relay state may indicate that the relay link is still viable and being used for communications. In other examples, the relay state may indicate that the relay link is no longer viable and therefore resources associated with the relay link can be released.

The operation(s) at blocks 1105, 1110, 1115, 1120 and/or 1125 may be performed using the ProSe relay manager 615 described with reference to FIGS. 6-8.

Thus, the method 1100 may provide for wireless communication. It should be noted that the method 1100 is just one implementation and that the operations of the method 1100 may be rearranged or otherwise modified such that other implementations are possible.

In some examples, aspects from two or more of the methods 900-1100 may be combined. It should be noted that the methods 900, etc. are just example implementations, and that the operations of the methods 900-1100 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may additionally be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Additionally, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are additionally included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying a wireless relay requirement for accessing one or more network functions;
   initiating, based at least in part on the identifying, a proximity service (ProSe) protocol on a user plane of a first wireless device and the ProSe protocol on a user plane of a second wireless device, wherein a communication protocol stack is associated with a first layer protocol and a second layer protocol and the ProSe protocol is a third layer protocol, and wherein the ProSe protocol is initiated prior to the communication protocol stack associated with an initiation of a communication data exchange between the first wireless device and the second wireless device; and
   establishing, via the ProSe protocol of the first wireless device and the ProSe protocol of the second wireless device, and based at least in part on the wireless relay requirement, a relay link between the first wireless device and the second wireless device on protocols of the user plane of the first wireless device and the user plane of the second wireless device, wherein the relay link utilizes signaling protocols distinct from protocols on the user plane of the first wireless device and the user plane of the second wireless device for the communication data exchange.

2. The method of claim 1, further comprising:
   managing one or more message exchanges between the first wireless device and the second wireless device, the one or more message exchanges associated with a ProSe association process of the ProSe protocol.

3. The method of claim 1, wherein the ProSe protocol is carried over a packet data convergence protocol (PDCP).

4. The method of claim 1, further comprising:
   identifying the ProSe protocol based at least in part on a packet data convergence protocol (PDCP) data unit type field associated with the ProSe protocol, wherein the data unit type field is distinguishable from other application protocol traffic.

5. The method of claim 1, further comprising:
   sending a ProSe association request message.

6. The method of claim 5, wherein the ProSe association request message comprises at least a message type parameter, or a command parameter, or a wireless device identity parameter, or a service layer information parameter, or a security information parameter, or an internet protocol (IP) configuration parameter, or a historical parameter, or a transaction identifier parameters, or a link identifier parameter, or a reason parameter, or a follow-up parameter, or a combination thereof.

7. The method of claim 5, further comprising:
   receiving a ProSe association response message.

8. The method of claim 7, wherein the ProSe association response message comprises at least a message type parameter, or a result parameter, or a command parameter, or a wireless device identity parameter, or a service layer information parameter, or a security information parameter, or an internet protocol (IP) configuration parameter, or a transaction identifier parameter, or a follow-up operation parameter, or a combination thereof.

9. The method of claim 7, wherein the ProSe association request message is sent from the first wireless device and the ProSe association response message is received from the second wireless device, or wherein the ProSe association request message is sent from the second wireless device and the ProSe association response message is received from the first wireless device.

10. The method of claim 7, wherein the ProSe association request message is sent from the second wireless device and the ProSe association response message is received from the first wireless device.

11. The method of claim 5, further comprising:
    exchanging one or more ProSe association follow-up messages to establish the relay link between the first wireless device and the second wireless device.

12. The method of claim 1, further comprising:
    determining that the first wireless device has entered a coverage area of at least one base station; and
    sending one or more messages to the second wireless device to terminate the relay link.

13. The method of claim 12, wherein the one or more messages comprise at least a message type parameter, or a command parameter, or a wireless device identity parameter, or a reason parameter, or a transaction identifier parameter, or a combination thereof.

14. The method of claim 1, wherein the relay link between the first wireless device and the second wireless device comprises a secure link.

15. The method of claim 1, further comprising:
    receiving a message from the second wireless device conveying an indication that the second wireless device has left a coverage area of at least one base station; and
    terminating the relay link based at least in part on the received message.

16. The method of claim 15, wherein the message comprise at least a message type parameter, or a command parameter, or a wireless device identity parameter, or a reason parameter, or a transaction identifier parameter, or a combination thereof.

17. The method of claim 1, further comprising:
    exchanging one or more messages with the second wireless device; and
    determining a relay state associated with the relay link based at least in part on the exchanged one or more messages.

18. The method of claim 17, wherein the one or more messages comprise at least an indication of one or more of a duration interval, or a link identifier parameter, or an identifier information parameter, or a wireless medium information associated with the relay link, or a combination thereof.

19. An apparatus for wireless communication, comprising:
    a processor;
    memory coupled with the processor; and
    instructions stored in the memory, the instructions being executable by the processor to:
       identify a wireless relay requirement for accessing one or more network functions;

initiate, based at least in part on the identifying, a proximity service (ProSe) protocol on a user plane of a first wireless device and the ProSe protocol on a user plane of a second wireless device, wherein a communication protocol stack is associated with a first layer protocol and a second layer protocol and the ProSe protocol is a third layer protocol, and wherein the ProSe protocol is initiated prior to the communication protocol stack associated with an initiation of a communication data exchange between the first wireless device and the second wireless device; and establish, via the ProSe protocol of the first wireless device and the ProSe protocol of the second wireless device, and based at least in part on the wireless relay requirement, a relay link between the first wireless device and the second wireless device on protocols of the user plane of the first wireless device and the user plane of the second wireless device, wherein the relay link utilizes signaling protocols distinct from protocols on the user plane of the first wireless device and the user plane of the second wireless device for the communication data exchange.

20. The apparatus of claim 19, further comprising instructions executable by the processor to:

manage one or more message exchanges between the first wireless device and the second wireless device, the one or more message exchanges associated with a ProSe association process of the ProSe protocol.

21. The apparatus of claim 19, wherein the ProSe protocol is carried over a packet data convergence protocol (PDCP).

22. The apparatus of claim 19, further comprising instructions executable by the processor to:

identify the ProSe protocol based at least in part on a packet data convergence protocol (PDCP) data unit type field associated with the ProSe protocol, wherein the data unit type field is distinguishable from other application protocol traffic.

23. The apparatus of claim 19, further comprising instructions executable by the processor to:

send a ProSe association request message.

24. The apparatus of claim 23, further comprising instructions executable by the processor to:

receive a ProSe association response message.

25. The apparatus of claim 23, further comprising instructions executable by the processor to:

exchange one or more ProSe association follow-up messages to establish the relay link between the first wireless device and the second wireless device.

26. The apparatus of claim 19, further comprising instructions executable by the processor to:

determine that the wireless device has entered a coverage area of at least one base station; and send one or more messages to the second wireless device to terminate the relay link.

27. The apparatus of claim 19, further comprising instructions executable by the processor to:

receive a message from the second wireless device conveying an indication that the second wireless device has left a coverage area of at least one base station; and terminate the relay link based at least in part on the received message.

28. The apparatus of claim 19, further comprising instructions executable by the processor to:

exchange one or more messages with the second wireless device; and determine a relay state associated with the relay link based at least in part on the exchanged one or more messages.

29. An apparatus for wireless communication, comprising:

means for identifying a wireless relay requirement for accessing one or more network functions;

means for initiating, based at least in part on the identifying, a proximity service (ProSe) protocol on a user plane of a first wireless device and the ProSe protocol on a user plane of a second wireless device, wherein a communication protocol stack is associated with a first layer protocol and a second layer protocol and the ProSe protocol is a third layer protocol, and wherein the ProSe protocol is initiated prior to the communication protocol stack associated with an initiation of a communication data exchange between the first wireless device and the second wireless device; and means for establishing, via the ProSe protocol of the first wireless device and the ProSe protocol of the second wireless device, and based at least in part on the wireless relay requirement, a relay link between the first wireless device and the second wireless device on protocols of the user plane of the first wireless device and the user plane of the second wireless device, wherein the relay link utilizes signaling protocols distinct from protocols on the user plane of the first wireless device and the user plane of the second wireless device for the communication data exchange.

30. A non-transitory computer-readable medium storing computer-executable code for wireless communication, the code executable by a processor to:

identify a wireless relay requirement for accessing one or more network functions;

initiate, based at least in part on the identifying, a proximity service (ProSe) protocol on a user plane of a first wireless device and the ProSe protocol on a user plane of a second wireless device, wherein a communication protocol stack is associated with a first layer protocol and a second layer protocol and the ProSe protocol is a third layer protocol, and wherein the ProSe protocol is initiated prior to the communication protocol stack associated with an initiation of a communication data exchange between the first wireless device and the second wireless device; and establish, via the ProSe protocol of the first wireless device and the ProSe protocol of the second wireless device, and based at least in part on the wireless relay requirement, a relay link between the first wireless device and the second wireless device on protocols of the user plane of the first wireless device and the user plane of the second wireless device, wherein the relay link utilizes signaling protocols distinct from protocols on the user plane of the first wireless device and the user plane of the second wireless device for the communication data exchange.

* * * * *